United States Patent [19]
Sekine

[11] Patent Number: 6,141,619
[45] Date of Patent: Oct. 31, 2000

[54] VEHICLE CONTROL SYSTEM

[75] Inventor: Hiroshi Sekine, Saitama, Japan

[73] Assignee: Honda Giken Kogyo Kabushiki Kaisha, Tokyo, Japan

[21] Appl. No.: 08/963,186

[22] Filed: Nov. 3, 1997

[30] Foreign Application Priority Data

Nov. 7, 1996 [JP] Japan ..................................... 8-295355

[51] Int. Cl.$^7$ ................................................. G06F 165/00
[52] U.S. Cl. ............................ 701/93; 701/205; 701/211; 340/990; 340/995
[58] Field of Search ................................ 701/93, 25, 205, 701/211, 209; 340/990, 995

[56] References Cited

U.S. PATENT DOCUMENTS

| | | | |
|---|---|---|---|
| 5,485,381 | 1/1996 | Heintz et al. ............................. | 701/93 |
| 5,703,780 | 12/1997 | Takanabe et al. ...................... | 701/209 |
| 5,748,476 | 5/1998 | Sekine et al. ............................ | 701/93 |

FOREIGN PATENT DOCUMENTS 0487280  5/1992  European Pat. Off. .

*Primary Examiner*—William A. Cuchlinski, Jr.
*Assistant Examiner*—Arthur D. Donnelly
*Attorney, Agent, or Firm*—Carrier, Blackman & Associates, P.C.; Joseph P. Carrier; William D. Blackman

[57] ABSTRACT

A vehicle control system controls vehicle speed and provides a warning by deciding whether or not the prevailing vehicle speed allows the vehicle to pass a curve in the road ahead in accordance with the surrounding environment of the vehicle. The system calculates a gaze angle, θ which is made between a direction a of a vehicle in its actual position $P_0$ and a segment b joining the actual position $P_0$ and a prospective position $P_n$. The vehicle speed control or warning is performed when the gaze angle θ exceeds a reference gaze angle. This reference gaze angle varies with the angle of view of the driver. At high-speed travel or at night where the drivers visibility angle is reduced, the reference gaze angle is set to a small value so that the vehicle control may be advanced. At low-speed travel or in the daytime where the driver's visibility angle is increased, the reference gaze angle is set to a large value so that the vehicle control may be delayed.

19 Claims, 9 Drawing Sheets

FIG.7A
LEFTWARD CURVE
FIG.7B
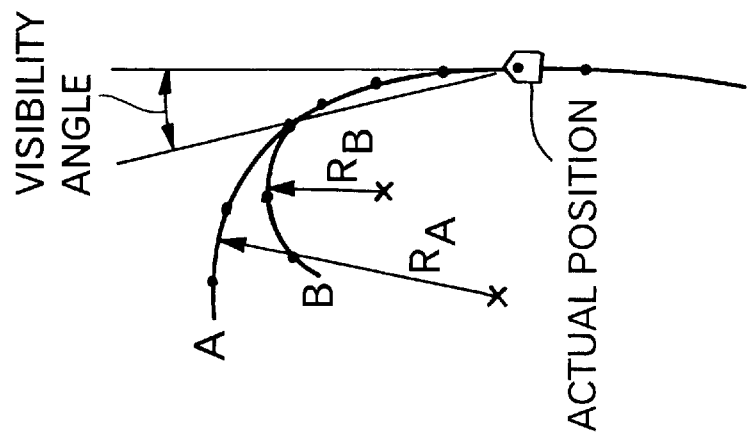
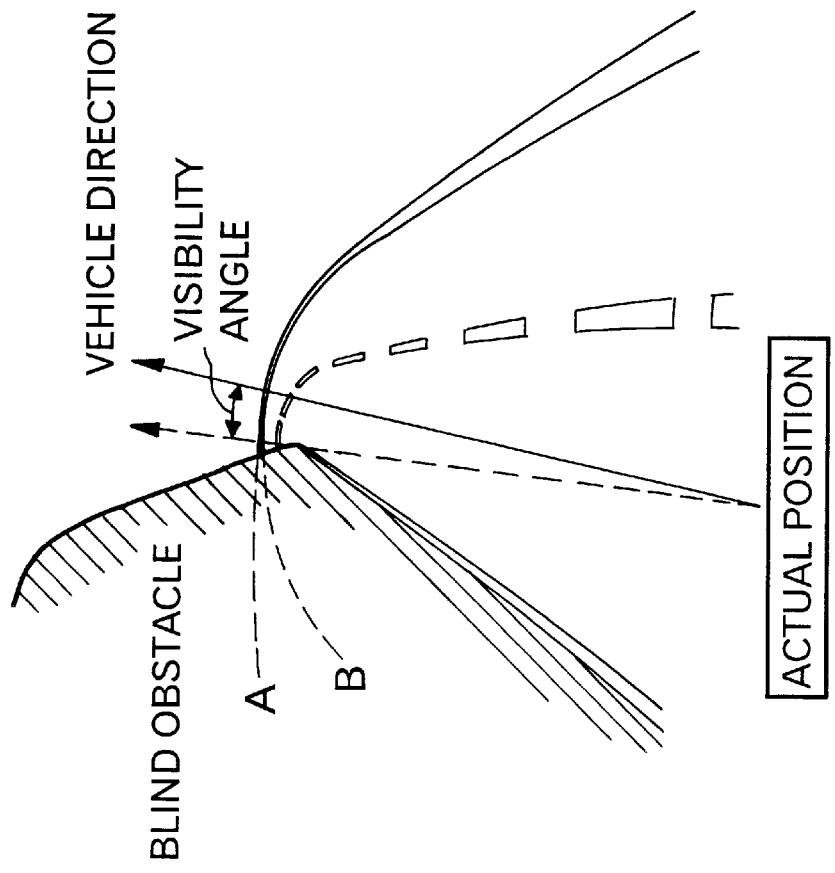

ered. As a result, when it is decided whether or not the vehicle can pass the curve ahead on the basis of the gaze angle or the curving degree of the road, the reference gaze angle is set

VEHICLE CONTROL SYSTEM

BACKGROUND OF THE INVENTION

1. Technical Field to Which the Invention Belongs

The present invention relates to a vehicle control system for controlling the vehicle speed and/or a driver warning device of a subject vehicle by detecting the road shape ahead of the subject vehicle on the basis of road data, to thereby decide whether or not the prevailing vehicle speed allows the vehicle to safely pass a curve ahead.

2. Discussion of Relevant Art

In Japanese Patent Application Laid-Open No. 60-89298, there is disclosed a well known technique through which it is decided whether or not the subject vehicle can pass a curve ahead thereof in its running direction at the prevailing speed by estimating the radius of curvature of the curve on the basis of the road data obtained by a navigation system, so that a warning can be issued to the driver if it is decided that the curve is not passable.

When so passing a curve, the range of the road ahead, as can be recognized without fail by the driver, seriously changes depending upon the vehicle speed, the weather and the curving direction so that the mental allowance for the driver accordingly changes. In the aforementioned known technique, however, what is done is to decide whether or not the prevailing vehicle speed allows passage of the curve, but no consideration is taken into the mentality of the driver. As a result, the issued warning may irritate the driver, and similarly if excessive speed control is automatically effected it may irritate the driver or its discrepancy may give the driver an uncomfortable feeling.

SUMMARY OF THE INVENTION

The present invention has been conceived in view of overcoming the limitations and disadvantages thus far described and has an object to make it possible to perform a vehicle control, as proper for the driver, in accordance with the surrounding environment of a vehicle.

According to a first aspect and feature of the invention there is provided a vehicle control system comprising:

map data outputting means (M1) for outputting map data including coordinate points (N) composing a road to be followed by a subject vehicle;

actual position detecting means (M2) for detecting an actual position ($P_0$) of the subject vehicle in a map;

vehicle speed detecting means (M3) for detecting a vehicle speed (V);

prospective position setting means (M5) for setting a prospective position (Pn) on the basis of the map data, the actual position ($P_0$) and the vehicle speed (V);

gaze angle calculating means (M6) for determining a gaze angle (θ) between segments joining the actual position (P0) with the prospective position ($P_n$) and the vehicle advancing direction;

reference gaze angle setting means (M8) for setting a reference gaze angle ($θ_L$, $θ_R$) based on the vehicle speed (V);

comparison means (M9) for comparing the gaze angle (θ) and the reference gaze angle ($θ_L$, $θ_R$); and control means (M10, M11) for controlling the vehicle based on a result of comparison by said comparison means (M9).

As a result, when it is decided whether or not the vehicle can pass the curve ahead on the basis of the gaze angle or the curving degree of the road, the reference gaze angle is set according to the vehicle speed so that a proper vehicle control can be made according to the mental state of the driver, which will vary typically with the vehicle speed.

According to a second aspect and feature of the invention there is also provided a vehicle control system comprising:

map data outputting means (M1) for outputting map data including coordinate points (N) composing a road to be followed by a subject vehicle;

actual position detecting means (M2) for detecting an actual position (P0) of the subject vehicle in a map;

tentative position setting means (M2') for setting a tentative position (P0') ahead of the actual position ($P_0$);

vehicle speed detecting means (M3) for detecting a vehicle speed (V);

prospective position setting means (M5) for setting a prospective position ($P_n$) based on the map data, the tentative position ($P_0'$) and the vehicle speed (V);

gaze angle calculating means (M6) for determining a gaze angle (θ) between segments joining the tentative position ($P_0'$) with the prospective position ($P_n$) and the vehicle advancing direction from the tentative position ($P_0'$);

reference gaze angle setting means (M8) for setting a reference gaze angle ($θ_L$, $θ_R$) based on the vehicle speed (V);

comparison means (M9) for comparing the gaze angle (θ) and the reference gaze angle ($θ_L$, $θ_R$); and control means (M10, M11) for controlling the vehicle based on a result of comparison by said comparison means (M9).

As with the second aspect of the invention, a proper vehicle control can be made according to the mental state of the driver, which will typically vary with the vehicle speed. Moreover, the gaze angle is set with reference to the tentative position, as set ahead of the actual position by tentative position setting means, whereby the vehicle control can be made with an allowance for the time period during which the vehicle reaches the tentative position from the actual position.

According to a third aspect and feature of the invention, the gaze angle is calculated by summing the angles of intersection of the segments joining adjoining ones of coordinates points for each of the coordinate points between the actual position or the tentative position and the prospective position. As a result, the gaze angle can be calculated easily and properly from map data composed of a set of coordinate points.

According to a fourth aspect and feature of the invention, the prospective position is set on the road ahead by the prospective length from the actual position or the tentative position. As a result, the prospective position can be easily and properly set.

According to a fifth aspect and feature of the invention, the reference gaze angle is corrected according to the surrounding environment of the vehicle. As a result, the proper vehicle control can be made according to the mental state of the driver which will typically vary with the surrounding environment of the vehicle.

According to a sixth aspect and feature of the invention, the reference gaze angle is corrected on the basis of the lighted state of an illumination lamp of the vehicle, the working state of a wiper, a selection by the driver, the width of the road or the curving direction of the road. As a result, the proper vehicle control can be made according to the surrounding environment of the vehicle or the intention or taste of the driver.

According to a seventh aspect and feature of the invention, a plurality of reference gaze angles with which the calculated gaze angle is to be compared are set. As a result, the vehicle speed control or the warning can be selectively used according to the difficulty in the curve passage.

The presently preferred embodiments of the present invention will be described below with reference to the accompanying drawings.

BRIEF DESCRIPTION OF THE DRAWINGS

FIGS. 7A and 7B are diagrams for explaining the operations in a leftward curving case used in the control system of FIG. 1.

DETAILED DESCRIPTION OF THE PREFERRED EMBODIMENTS

With reference to FIGS. 1–8 of the accompanying drawings, there is shown a vehicle control system according to a presently preferred embodiment of the invention.

Figure 1:
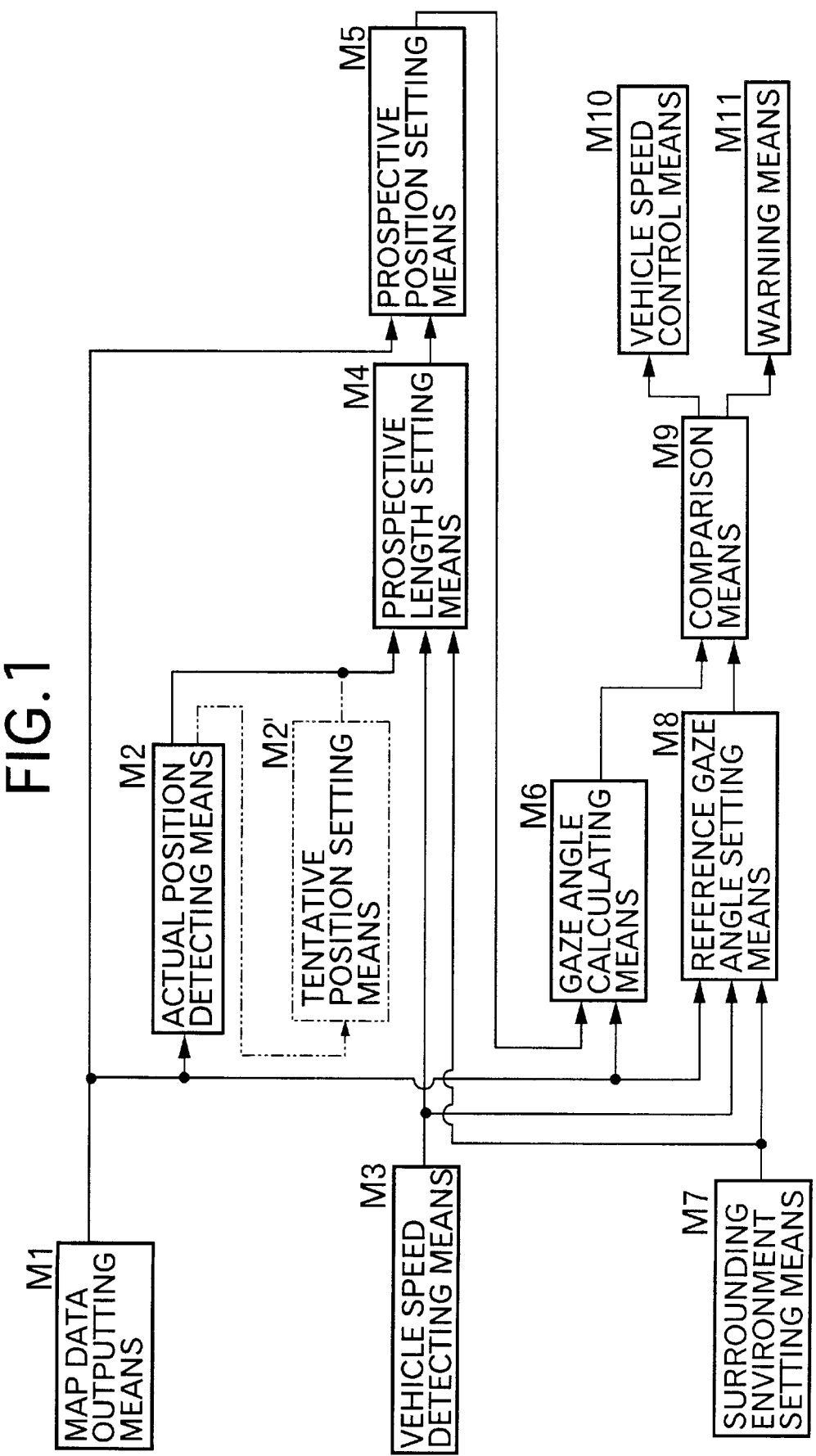
FIG. 1 is a block diagram showing the entire construction of a vehicle control system according to a presently preferred embodiment of the invention.

As shown in FIG. 1, the vehicle control system of the present embodiment is constructed to comprise map data outputting means M1, actual position detecting means M2, vehicle speed detecting means M3, prospective length setting means M4, prospective position setting means M5, gaze angle calculating means M6, surrounding environment setting means M7, reference gaze angle setting means M8, comparison means M9, vehicle speed control means M10, and warning means M11. The vehicle speed control means M10 and the warning means M1 jointly comprise the control means of the present invention.

The map data outputting means M1 and the actual position detecting means M2 are mounted on a vehicular navigation system, as well known in the art. The map data outputting means M1 reads and outputs the map data of a predetermined range, as stored in advance in an IC card or CD-ROM, and the actual position detecting means M2 detects its actual position $P_0$ on the map by overlapping the road data and the actual position data, as received by a GPS antenna, for example. The vehicle speed detecting means M3 detects the prevailing vehicle speed V on the basis of the outputs of wheel speed sensors fitted to the individual wheels.

When it is decided whether or not the vehicle can pass a curve existing ahead on the road being followed thereby, the prospective length setting means M4 calculates a prospective length L or a parameter for determining how far from the actual position $P_0$ the road shape should be considered.

Figure 3:
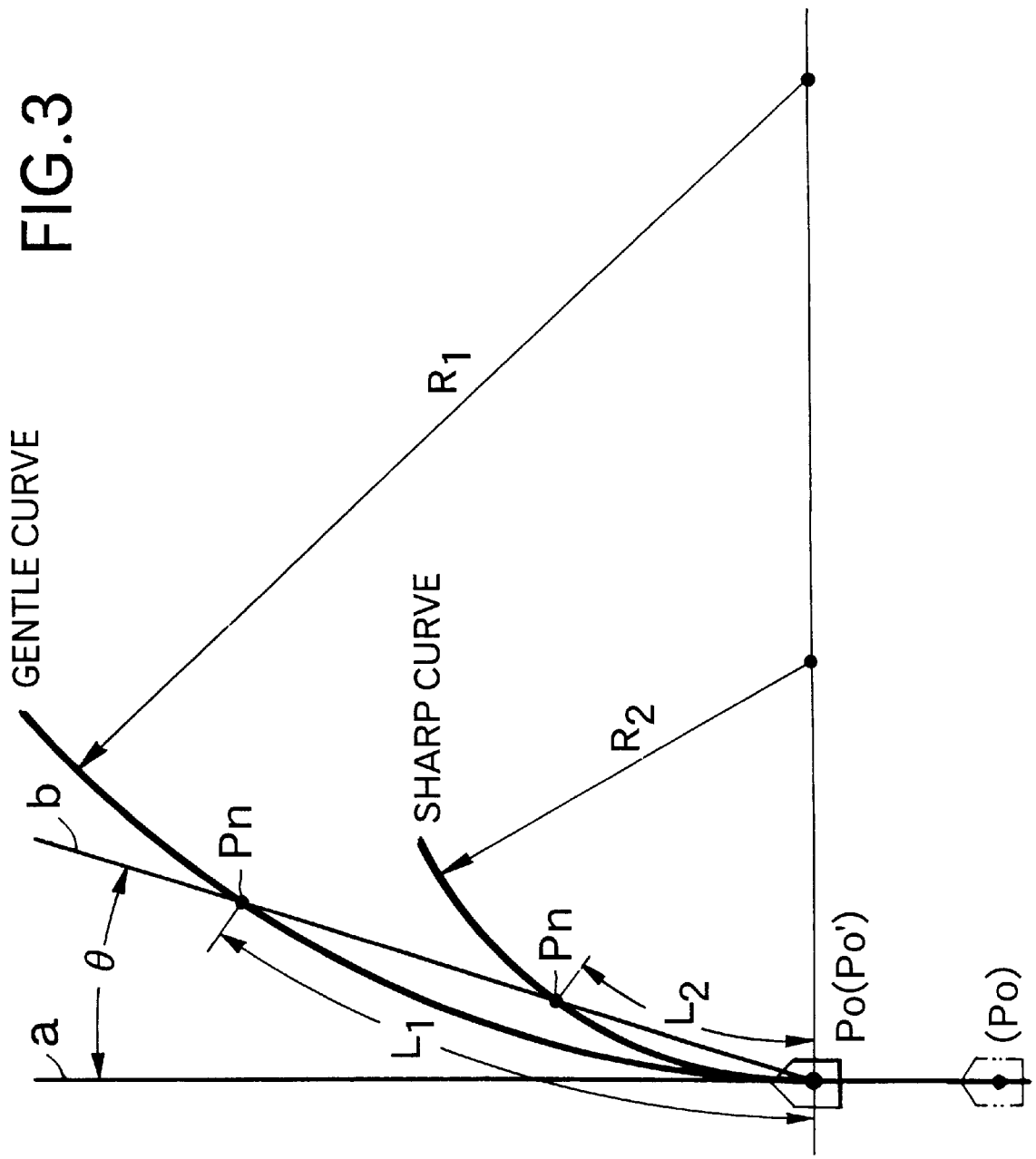
FIG. 3 is a graph for setting a prospective length used in the control system of FIG. 1.

As illustrated in FIG. 3, an angle made between a straight line a, as extended ahead of the vehicle from the actual position $P_0$, and a straight line b, as drawn between the actual position P0 and a prospective position $P_n$ set ahead on the road, is defined as a gaze angle θ. When the gaze angle θ is larger than a predetermined reference value, the present embodiment decides the ahead curve to be sharp and makes a warning or controls the vehicle speed. Relatedly, when the prospective length L takes a large value $L_1$, the road has a large radius of curvature $R_1$ for a constant gaze angle θ so that the vehicle can easily pass the curve. When the prospective length L takes a small value $L_2$, on the other hand, the road has a small radius of curvature $R_2$ for the constant gaze angle θ so that the vehicle cannot pass the curve without difficulty.

Figure 4:
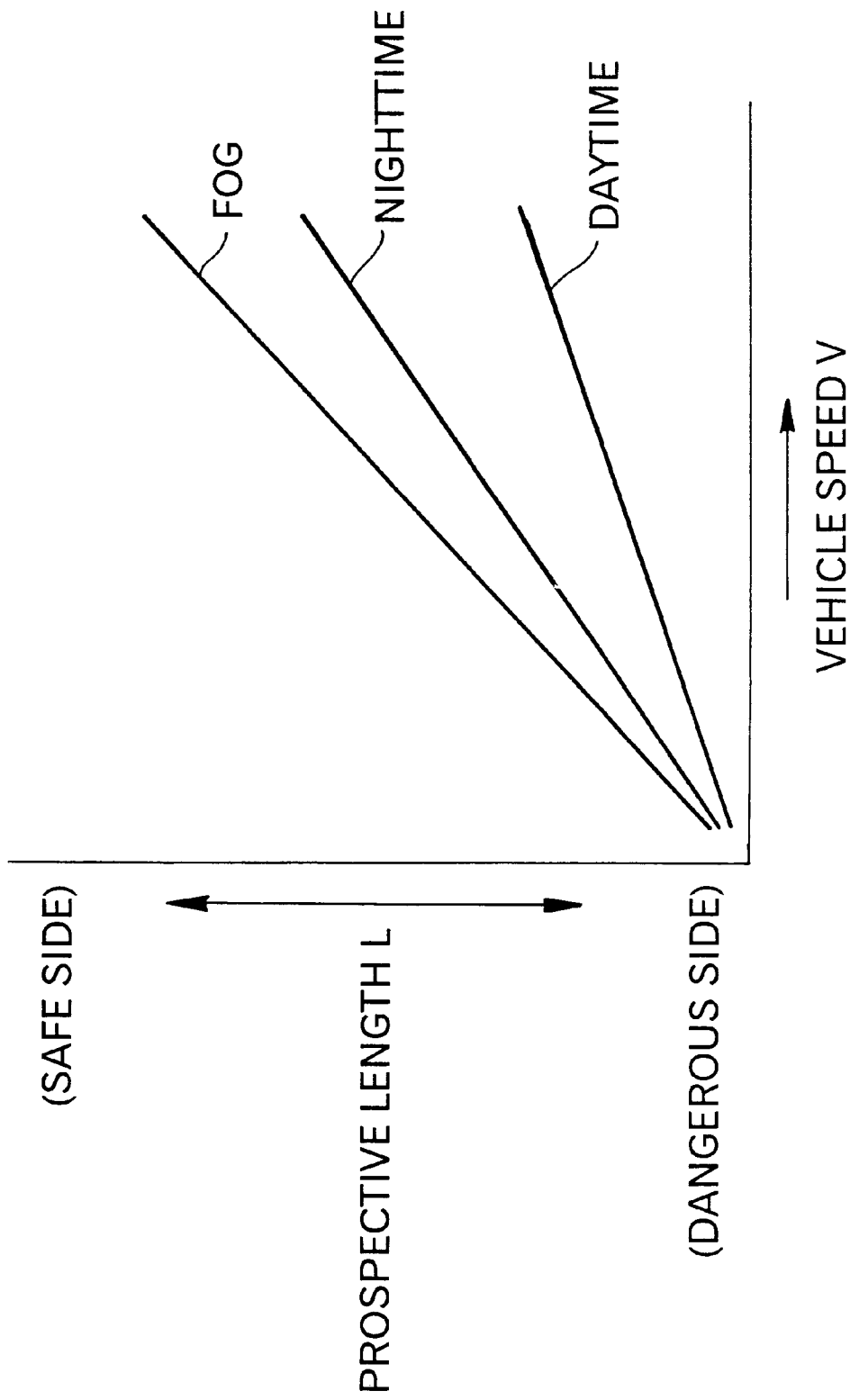
FIG. 4 is another graph for setting the prospective length used in the control system of FIG. 1.

In other words, if the prospective length L is set to a large value, the warning or the speed control may be easily executed even for a gentle curve so that the reference for decision is deviated to a more allowable side. If the prospective length L is set to a small value, on the other hand, the frequency or timing of executing the warning or speed control is suppressed even for a sharp curve so that the reference decision is shifted to a less allowable side. From this standpoint, the prospective length L is so elongated for a high speed condition to give a large turning radius to the vehicle, as shown in FIG. 4, that the decision reference may be deviated to the more allowable side. At night or in a fog lowering the visibility of the driver, too, the prospective length L is elongated as shown in FIG. 4 to deviate the decision reference to the more allowable side.

Specifically, the prospective length L is set (L=t×V) by multiplying a predetermined prospective time period t and the vehicle speed V detected by the vehicle speed detecting means M3. When a daytime condition for enhancing the visibility of the driver is detected by the later-described surrounding environment setting means M7, the prospective time period t is corrected to a shorter side to shorten the prospective length L. When a nighttime condition or a fog condition which lowers the visibility of the driver is detected, the prospective time period t is corrected to a longer side to elongate the prospective length L (again, with reference to FIG. 4).

Reverting to FIG. 1, the prospective position setting means MS determines the prospective position $P_n$ by overlapping the data, as obtained from map data outputting means M1, of the road ahead of the subject vehicle and the prospective length L, as set by the prospective length setting means M4. As apparent from FIG. 5, the data, as obtained from the map data outputting means M1, of the road ahead of the subject vehicle are constructed of a set of multiple nodes $N_0$, $N_1$, $N_2$, $N_3$, N4, - - - , and so on, as having coordinates (X, Y), respectively. The node, as located the closest to the actual position $P_0$, is selected as the 0th node $N_0$, and the n-th node $N_n$, as located the closest to the position which is ahead by the prospective length L calculated along the road from the actual position $P_0$, is selected as the prospective position $P_n$. At this time, the distances between the adjoining nodes can be calculated on the basis of the coordinates (X, Y) of the individual nodes.

When the prospective position $P_n$ is thus determined, the curvature of the road ahead of the vehicle is calculated, in the gaze angle calculating means M6, as the value of the gaze angle θ (as made between the straight line a extended ahead of the vehicle from the actual position $P_0$ and the straight line b extended from the actual position $P_0$ to the prospective position $P_n$).

Specifically, the gaze angle $\theta$ is approximately given as the total sum ($\theta = \theta_1 + \theta_2 + \theta_3 + \cdots + \theta_n$) of angles of intersection $\theta_1, \theta_2, \cdots,$ and $\theta_n$, if the intersection angle $\theta_1$ is made between a straight line joining a minus 1st node $N_{-1}$ (i.e., a node one node short of the 0th node $N_0$) and the 0th node $N_0$ and a straight line joining the 0th node $N_0$ and the 1st node $N_1$, if the intersection angle $\theta_2$ is made between a straight line joining the 0th node $N_0$ and the 1st node $N_1$ and a straight line joining the 1st node $N_1$ and the 2nd node $N_2$, ---, and if the intersection angle $\theta_n$ is made between a straight line joining the (n-2)th node $N_{n-2}$ and the (n-1)th node $N_{n-1}$ and a straight line joining the (n-1)th node $N_{n-1}$ and the n-th node $N_n$. At this time, the individual intersection angles $\theta_1, \theta_2, ---,$ and $\theta_n$ can be calculated on the basis of the coordinates (X, Y) of the individual nodes.

Figure 5:
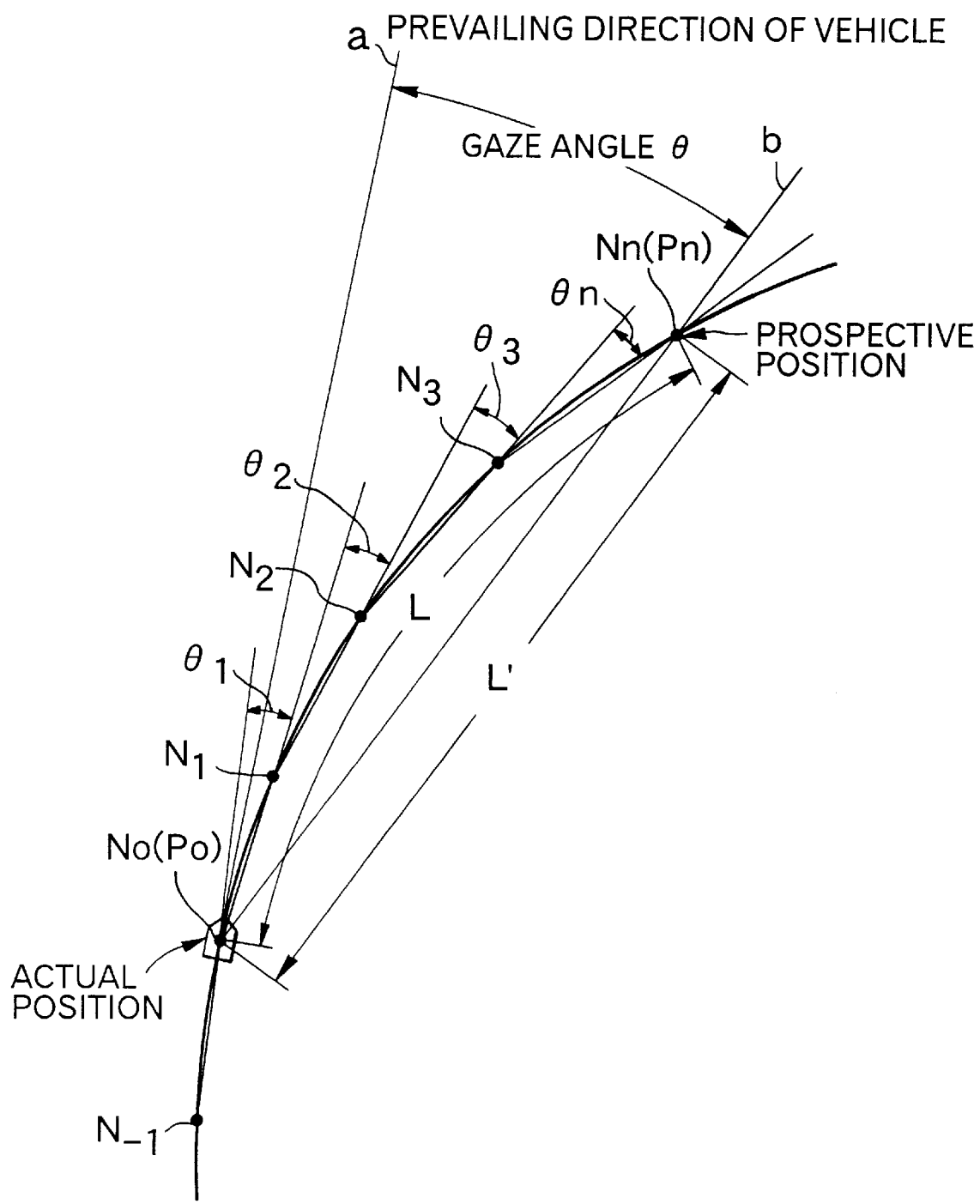
FIG. 5 is a diagram for explaining a method of calculating a gaze angle used in the control system of FIG. 1.
Figure 6B:
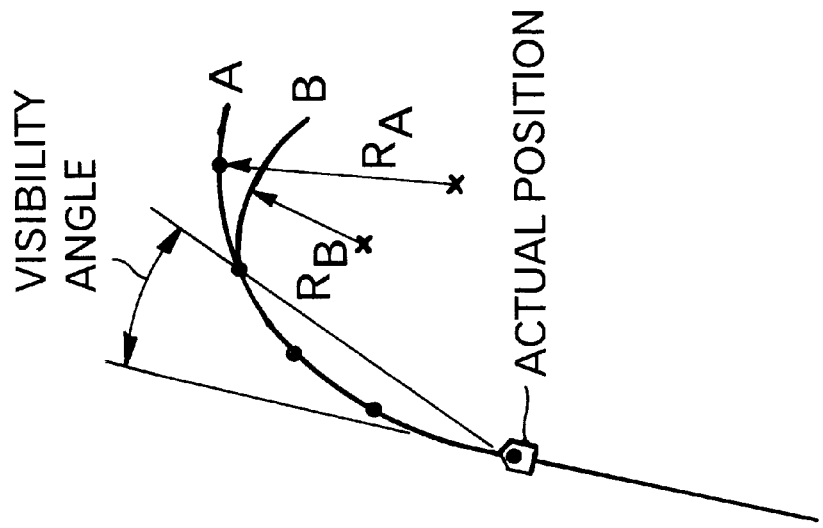
FIGS. 6A and 6B are diagram s for explaining the operations in a rightward curving case used in the control system of FIG. 1.
Figure 6A:
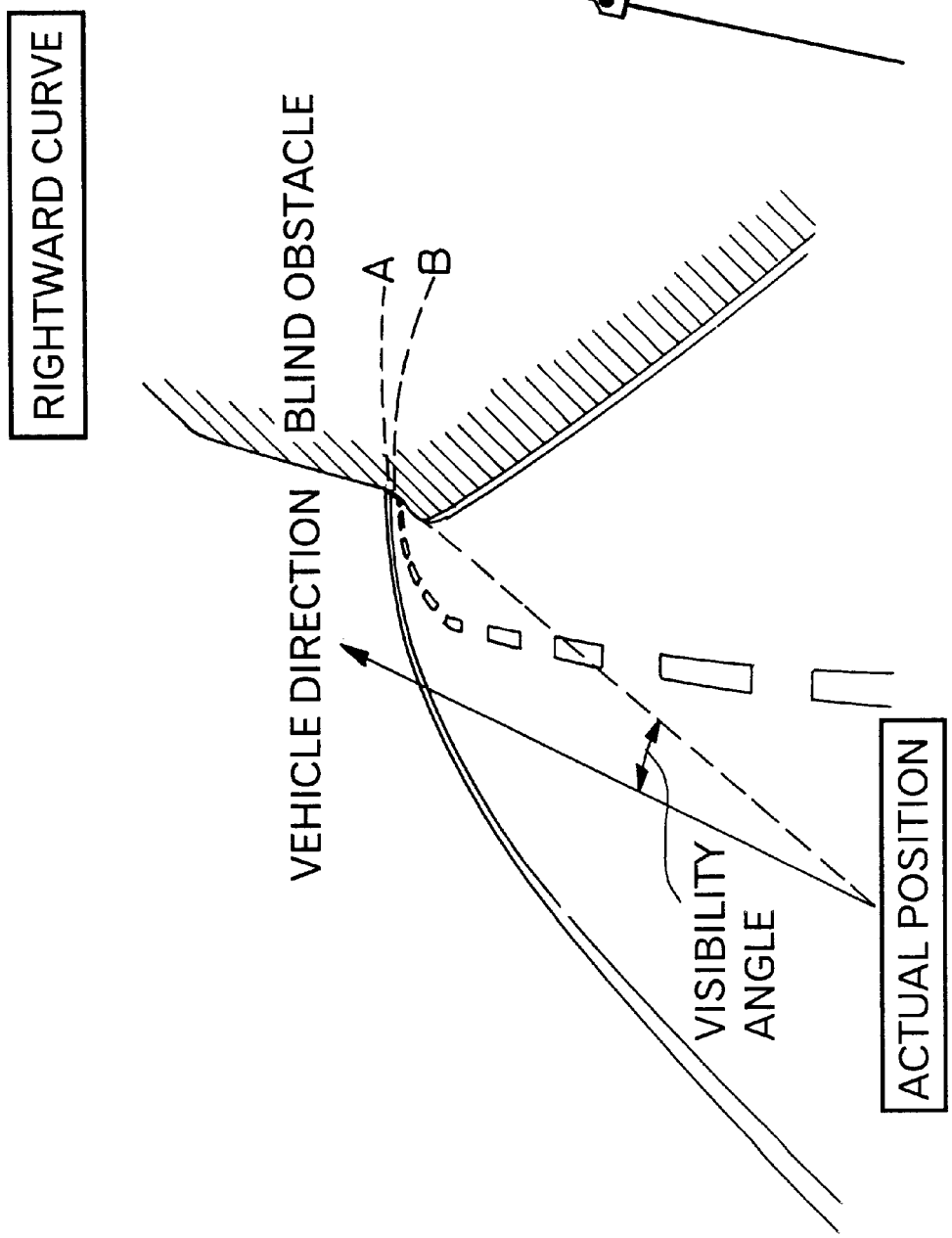

Here, when the prospective position $P_n$ is to be calculated, the prospective length L could be measured as a straight distance from the actual position $P_0$ in place of the curve distance of the road from the actual position $P_0$ (as should be referred to a prospective length L' of FIG. 5).

The surrounding environment setting means M7 is constructed of a headlight switch, a small light switch, a fog light switch, a fog sensor and/or a wiper switch for discriminating daytime, nighttime, fog or rain conditions to detect whether or not the driver is given sufficient sight. Here, the surrounding environment setting means M7 could be constructed of a switch to be operated according to the will or desire of the driver.

The reference gaze angle setting means M8 sets reference gaze angles $\theta_L$ and $\theta_R$ for deciding the magnitude of the gaze angle $\theta$, on the basis of the vehicle speed V detected by the vehicle speed detecting means M3, the curving direction (rightwards or leftwards) and width of the road, as outputted by the map data outputting means M1, and the driver's sight, as detected by the surrounding environment setting means M7. The reference gaze angles $\theta_L$ and $\theta_R$ are applied to the leftward curve and the rightward curve to be passed, respectively, so that they are given different magnitudes for the roads of left-hand and right-hand passages as described later.

Figure 8:
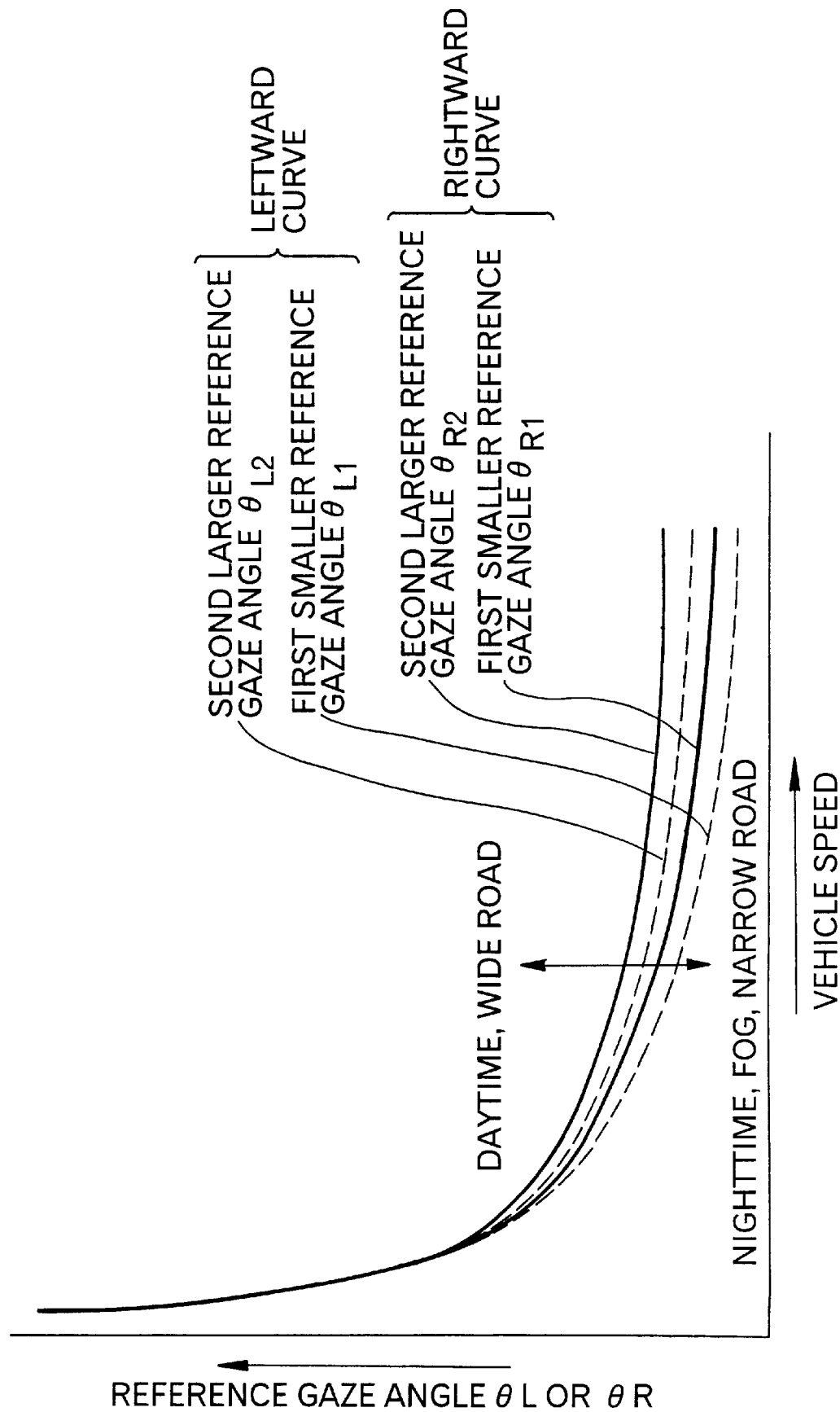
FIG. 8 is a graph plotting characteristics of a reference gaze angle used in the control system of FIG. 1.

The reference gaze angles $\theta_L$ and $\theta_R$ for deciding the magnitudes of the gaze angle $\theta$ are determined according to the angle of visibility of the driver. This visibility angle is a parameter indicating how wide range of angle from the advancing direction of the vehicle the driver can recognize an object, and it varies with the following factors 1 to 4. Moreover, FIG. 8 plots the characteristics of the reference gaze angles $\theta_L$ and $\theta_R$ which are determined according to the magnitudes of the visibility angle. As the reference gaze angles $\theta_L$ and $\theta_R$ grow smaller so that their lines move the lower, as illustrated in FIG. 8, the vehicle speed control means M10 and the warning means M11 are activated for the smaller gaze angle $\theta$ (i.e., the more gentle curve) so that the reference gaze angles $\theta_L$ and $\theta_R$ are deviated to the more allowable side.

1. Vehicle Speed

As the vehicle speed V rises to the higher value, the driver is less able to recognize objects passing sideways of the vehicle at a high speed, so that the visibility angle becomes the smaller to reduce the reference gaze angles $\theta_L$ and $\theta_R$. As the vehicle speed V drops, the reference gaze angles $\theta_L$ and $\theta_R$ increase. The vehicle speed V is the most important factor for setting the reference gaze angles $\theta_L$ and $\theta_R$.

2. Visibility

At night or in a bad weather such as fog, the forward sight becomes poor so that the visibility angle is reduced to reduce the reference gaze angles $\theta_L$ and $\theta_R$. In the daytime giving a sufficient forward sight, on the other hand, the reference gaze angles $\theta_L$ and $\theta_R$ are increased.

3. Curving Direction

At a leftward curve of a road of left hand passage where obstructions such as mountains or buildings are present, for example, the visibility angle is reduced to obstruct the forward sight thereby to reduce the reference gaze angles $\theta_L$ and $\theta_R$. At a rightward curve, on the other hand, the visibility angle is increased to give sufficient forward sight thereby to increase the reference gaze angles $\theta_L$ and $\theta_R$ (refer to FIGS. 6A and 7A).

4. Road Width

On a narrow road, the field of view is obstructed to reduce the visibility angle and accordingly the reference gaze angles $\theta_L$ and $\theta_R$. On a wide road, on the other hand, the reference gaze angles $\theta_L$ and $\theta_R$ are increased.

Here, the reference gaze angle $\theta_L$ of the leftward curve is composed of a first smaller reference gaze angle $\theta_{L1}$ and a second larger reference gaze angle $\theta_{L2}$, and the reference gaze angle $\theta_R$ of the rightward curve is likewise composed of a first smaller reference gaze angle $\theta_{R1}$ and a second larger reference gaze angle $\theta_{R2}$.

Thus, the gaze angle $\theta$ ahead on the road, as calculated by the gaze angle calculating means M6, and the reference gaze angles $\theta_L$ and $\theta_R$, as set by the reference gaze angle setting means M8, are compared by the comparison means M9. As a result, for a leftward curve, when the gaze angle $\theta$ or a curving degree is increased at first to exceed the first smaller reference gaze angle $\theta_{L1}$, the warning means M11 such as a buzzer or chime or light is actuated to urge the driver to decelerate the vehicle. When the gaze angle $\theta$ is nevertheless further increased to exceed the second larger reference gaze angle $\theta_{L2}$, the vehicle speed control means M10, such as an actuator for closing the throttle valve or a brake actuator is actuated automatically to decelerate the vehicle. For a rightward curve, too, when the gaze angle $\theta$ is increased to exceed the first smaller reference gaze angle $\theta_{R1}$, the warning means M11 is activated. When the gaze angle $\theta$ is further increased to exceed the second larger reference gaze angle $\theta_{R2}$, the vehicle speed control means M10 is activated.

Figure 2:
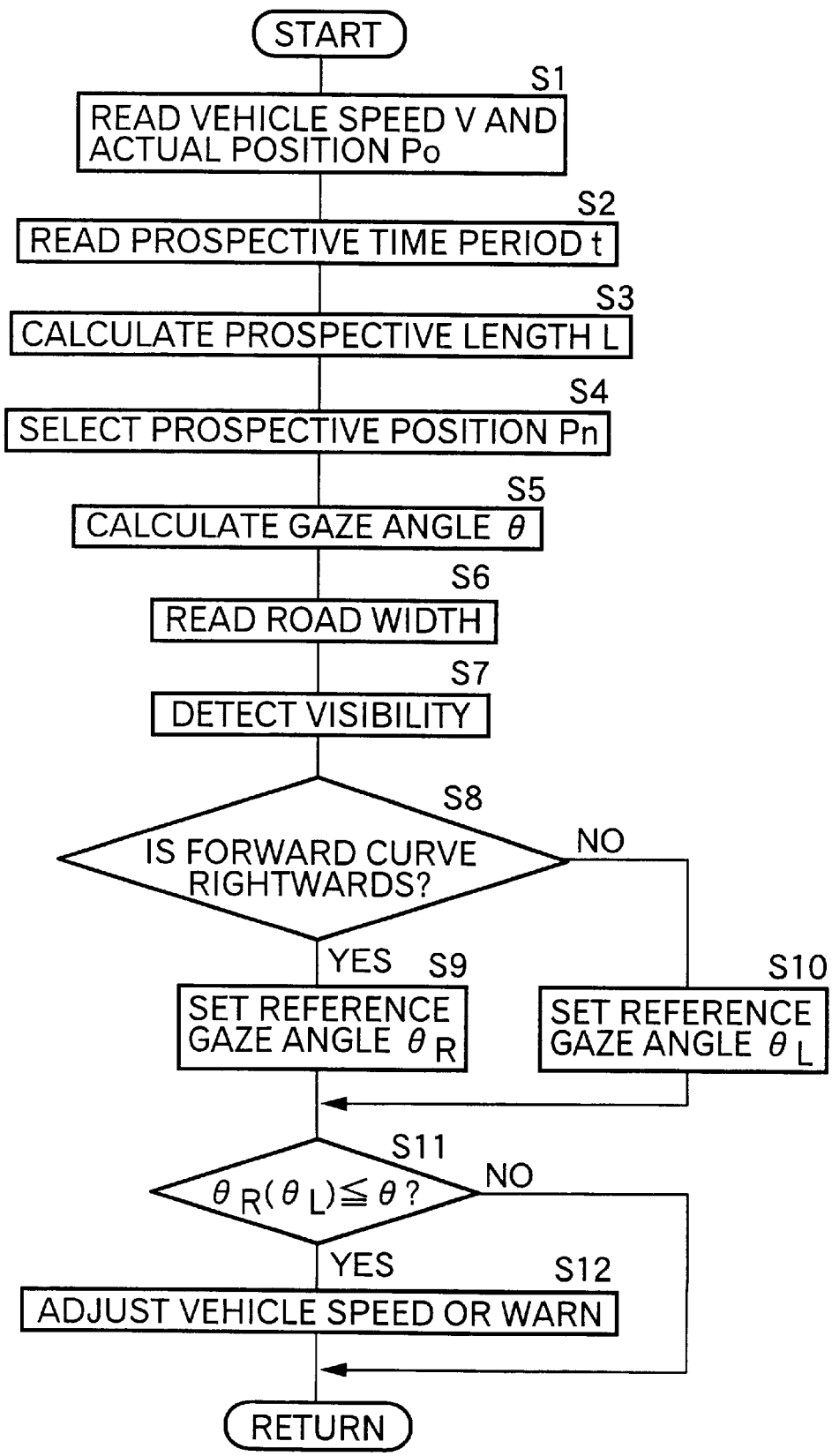
FIG. 2 is a flow chart for explaining the operations of the control system of FIG. 1.

These actions will be described in more detail with reference to the flowchart of FIG. 2.

First of all, the vehicle speed V and the actual position $P_0$ are read in at step S1, and a predetermined prospective time period t is read in at step S2. Then, the prospective length L is calculated at step S3 by multiplying the vehicle speed V and the prospective time period t, and the prospective position $P_n$ is set at step S4 on the road ahead of the actual position P0 by the prospective length L. At subsequent step S5, the gaze angle $\theta$ or the angle made between the straight line extended ahead of the vehicle from the actual position $P_0$ at step S4 and the straight line extended from the actual position $P_0$ to the prospective position $P_n$ is calculated on the basis of the coordinates (X, Y) of the individual nodes N.

Next, the road width and the visibility are detected at steps S6 and S7, and the curving direction of the road is detected at step S8. On the basis of these data and the aforementioned vehicle speed V, the reference gaze angle $\theta_R$ (including $\theta_{R1}$ and $\theta_{R2}$) for the rightward curve and the reference gaze angle $\theta_L$ (including $\theta_{L1}$ and $\theta_{L2}$) for the leftward curve are set at steps S9 and S10, respectively. When the gaze angle $\theta$ exceeds the first smaller reference gaze angle $\theta_{L1}$ or $\theta_{R1}$ at step S11, the warning means M11 is activated at step S12 to urge the driver to decelerate the vehicle. When the gaze angle θ is further increased irrespective of the warning to exceed the second larger reference gaze angle $θ_{L2}$ or $θ_{R2}$, the vehicle speed control means M10 is actuated at step S12 to decelerate the vehicle automatically. As a result, the vehicle can pass the curve ahead without fail.

For setting the reference gaze angles $θ_L$ and $θ_R$, the visibility angle of the driver is considered rather than the radii of curvature (as should be referred to $R_1$ and $R_2$ of FIGS. 6B and 7B) of the road because such radii extend so far as to make the driver blind thereto. As a result, the warning or the vehicle speed control can be advanced, when the visibility angle is so small as to make the driver anxious. In the conventionally known system where the warning or the vehicle speed control is made on the basis of the radius of curvature of the road, however, the warning or control is not performed when a road A making the driver blind thereto is gently curved, as shown in FIG. 7B. Nonetheless, the driver feels anxious because the small visibility angle disables the driver from recognizing the radius of curvature of the road. According to the invention, however, the warning or the vehicle speed control is advanced in the present embodiment so that the driver can drive the car without any anxiety.

Figure 9:
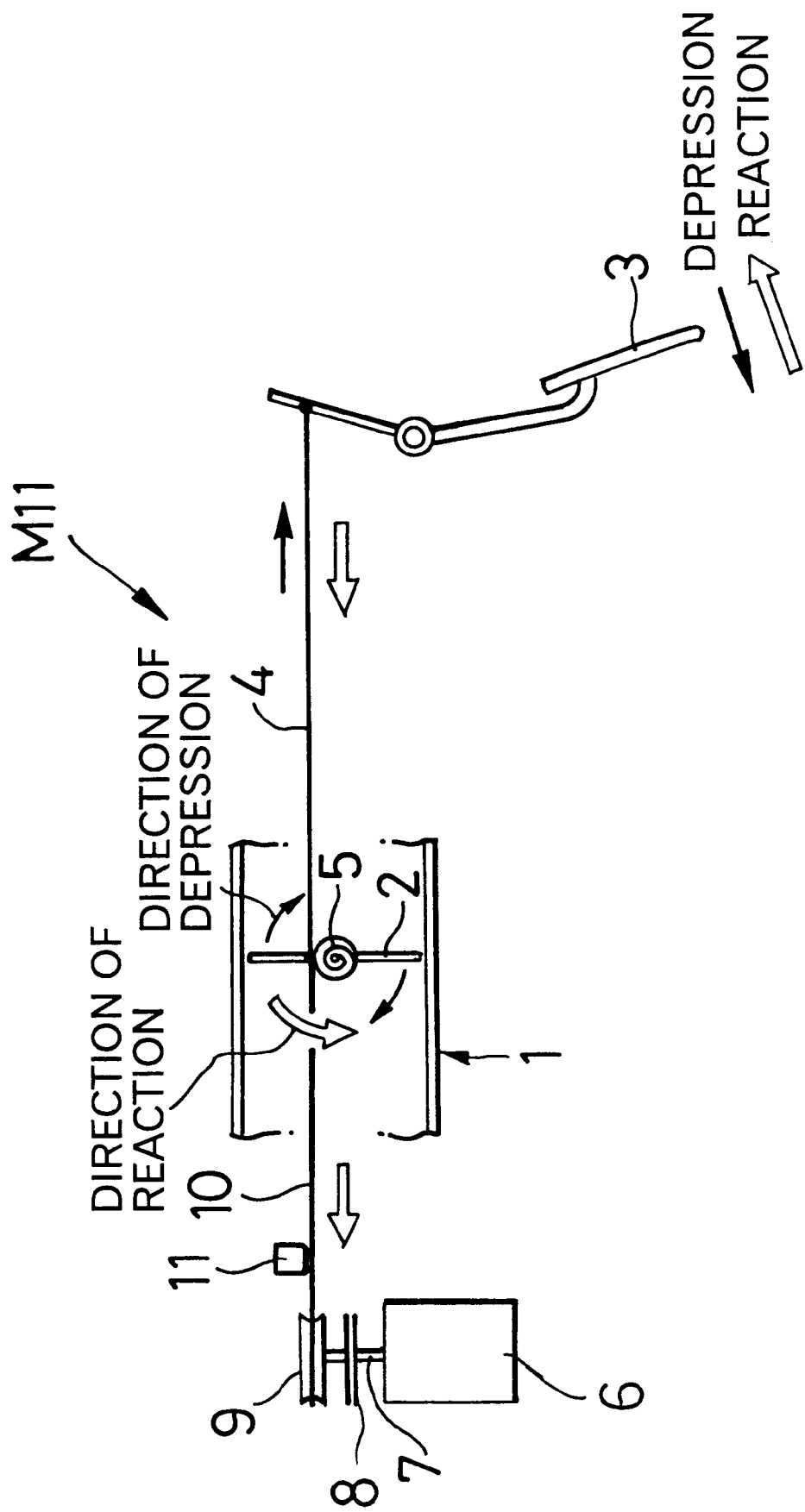
FIG. 9 is a diagram showing a second preferred embodiment of a warning device according to the invention.

FIG. 9 shows another embodiment of the warning means M11. The foregoing warning means M11 employs the sound of the buzzer or chime or light as the operative media, but the warning means M11 of this second embodiment employs the reaction of an accelerator pedal as the operative media.

A throttle valve 2, as fitted to a throttle body 1 of an engine, is connected to an accelerator pedal 3 through a wire 4. When the accelerator pedal 3 is depressed, the throttle valve 2 is opened against the elastic force of a spring 5. When the accelerator pedal 3 is released, the throttle valve 2 is closed by the elastic force of the spring 5. On an output shaft 7 of an actuator 6 made of a torque motor, on the other hand, there is supported through an electromagnetic clutch 8, a drum 9, on which is wound one end of a wire 10. The other end of this wire 10 is connected to the throttle valve 2. To the wire 10, there is connected a depression sensor 11 for detecting the force of depression, as applied to the accelerator pedal 3, on the basis of the magnitude of the tension of the wire 10.

When the gaze angle θ is smaller than the reference gaze angle $θ_L$ or $θ_R$, so that no warning is made to the driver, the electromagnetic clutch 8 is held in a disengaged state. As a result, even when the motion of the accelerator pedal 3 is transmitted through the wire 4, the throttle valve 2 and the wire 10 to the drum 9, it is intercepted by the clutch 8 but not transmitted to the actuator 6 so that the accelerator pedal 3 is operated by the driver without any trouble.

When the gaze angle θ exceeds the reference gaze angle $θ_L$ or $θ_R$, the electromagnetic clutch 8 is engaged to give a physical warning to the driver, and the actuator 6 establishes a torque, which is applied through the electromagnetic clutch 8, the drum 9 and the wire 10 to energize the throttle valve 2 in a closing direction. As a result, a reaction against the depression of the accelerator pedal 3 is established to suppress the depression of the accelerator pedal 3, even when the driver depresses the accelerator to accelerate the vehicle. This suppression convinces the driver that a curve difficult to pass is awaiting ahead, and urges the driver to decelerate the vehicle.

While the actuator 6 is establishing the torque against the depression of the accelerator pedal 3, the electromagnetic clutch 8 will nevertheless be released, if the driver intensely depresses the accelerator pedal 3 to avoid a danger, for example, such that the depression sensor 11 detects a depression higher than a predetermined value. When the intention of the driver for acceleration is thus confirmed, the torque of the actuator 6 is cut to allow the throttle valve 2 to be opened, so that the vehicle can be accelerated according to the intention of the driver.

The warning means M11 of the second embodiment does not employ the audible or visible alarm such as in the first embodiment, but its action is recognized by the driver only so that the remaining passenger is not troubled by the sound or light.

As has been described hereinbefore, when it is decided according to the embodiments of the invention whether or not the vehicle can pass the curve ahead on the basis of the gaze angle or the curving degree of the road, the reference gaze angle for the decision reference is set according to the vehicle speed so that a proper vehicle control can be made according to the mental state of the driver, as varying with the vehicle speed. Moreover, the gaze angle according to the embodiments of the invention may be set with reference to the tentative position, and the vehicle control can be made with an allowance for the time period during which the vehicle reaches the tentative position from the actual position. Further, the gaze angle can be calculated easily and properly according to the embodiments of the invention from map data composed of a set of coordinate points.

On the other hand, prospective length setting means sets the prospective position on a road ahead of the actual position or the tentative position by the prospective length, and as a result, the prospective position can be easily and properly set. Still further, because the reference gaze angle setting means may correct the reference gaze angle according to the surrounding environment of the vehicle, the proper vehicle control can be made according to the mental state of the driver varying with the surrounding environment of the vehicle. More specifically, because the surrounding environment setting means may set the surrounding environment of the vehicle on the basis of the lighted state of an illuminating lamp of the vehicle, the working state of the vehicle wiper, or a selection by the driver, the proper vehicle control can be simply made according to the detected condition of the lamp or wiper, or the intention or taste of the driver.

Further yet, the reference gaze angle setting means may correct the reference gaze angle on the basis of the width of the road or whether the road ahead is a rightward curve or a leftward curve. As a result, a more proper vehicle control can be easily achieved.

Although the present invention has been described in detail in connection with the presently preferred embodiments, it will be understood by persons skilled in the art that various changes and modifications may be made thereto without departing from the spirit or essence thereof.

In the embodiments, for example, the gaze angle θ is set with reference to the actual position $P_0$. In FIG. 1, however, tentative position detecting means M2' is combined with the actual position detecting means M2 so that the gaze angle θ can be set with reference to a tentative position $P_0'$ located ahead of the actual position $P_0$ by a predetermined distance. Then, a more allowable vehicle control can be made by deciding the propriety for passage of a curve before the vehicle reaches the tentative position $P_0'$ from the actual position $P_0$. In order to retain the time period for the vehicle to reach the tentative position $P_0'$ from the actual position $P_0$ independently of the vehicle speed V, the distance from the actual position $P_0$ to the tentative position $P_0'$ may be elongated according to the vehicle speed V.

The scope of the invention is indicated by the appended claims, rather than by the foregoing description of the presently preferred embodiments.

We claim:

1. A vehicle control system comprising:

map data outputting means for outputting map data including coordinate points composing a road to be followed by a subject vehicle;

actual position detecting means for detecting an actual position of the subject vehicle in a map;

vehicle speed detecting means for detecting a vehicle speed;

prospective position setting means for setting a prospective position on the basis of the map data, the actual position and the vehicle speed;

gaze angle calculating means for determining a gaze angle between segments joining the actual position with the prospective position and a vehicle advancing direction;

reference gaze angle setting means for setting a reference gaze angle based on the vehicle speed;

comparison means for comparing the gaze angle and the reference gaze angle; and control means for controlling the vehicle based on a result of comparison by said comparison means.

2. A vehicle control system comprising:

map data outputting means for outputting map data including coordinate points composing a road to be followed by a subject vehicle;

actual position detecting means for detecting an actual position of the subject vehicle in a map;

tentative position setting means for setting a tentative position ahead of the actual position;

vehicle speed detecting means for detecting a vehicle speed;

prospective position setting means for setting a prospective position based on the map data, the tentative position and the vehicle speed;

gaze angle calculating means for determining a gaze angle between segments joining the tentative position with the prospective position and a vehicle advancing direction in the tentative position;

reference gaze angle setting means for setting a reference gaze angle based on the vehicle speed;

comparison means for comparing the gaze angle and the reference gaze angle; and control means for controlling the vehicle based on a result of comparison by said comparison means.

3. A vehicle control system as set forth in claim 1, wherein said gaze angle calculating means calculates the gaze angle from a sum of angles of intersection of segments joining adjoining ones of said coordinate points for each said coordinate point between the actual position and the prospective position.

4. A vehicle control system as set forth in claim 2, wherein said gaze angle calculating means calculates the gaze angle from a sum of angles of intersection of segments joining adjoining ones of said coordinate points for each said coordinate point between the tentative position and the prospective position.

5. A vehicle control system as set forth in claim 1, further comprising prospective length setting means for setting a prospective length, wherein said prospective position setting means sets the prospective position on a road ahead of the actual position by said prospective length.

6. A vehicle control system as set forth in claim 2, further comprising prospective length setting means for setting a prospective length, wherein said prospective position setting means sets the prospective position on a road ahead of the tentative position by said prospective length.

7. A vehicle control system as set forth in claim 1, further comprising surrounding environment setting means for setting a surrounding environment of the vehicle, wherein said reference gaze angle setting means corrects the reference gaze angle according to the surrounding environment of the vehicle.

8. A vehicle control system as set forth in claim 7, wherein said surrounding environment setting means sets the surrounding environment of the vehicle based on a lighted state of an illuminating lamp of the vehicle.

9. A vehicle control system as set forth in claim 7, wherein said surrounding environment setting means sets the surrounding environment of the vehicle based on a working state of a wiper of the vehicle.

10. A vehicle control system as set forth in claim 7, wherein said surrounding environment setting means sets the surrounding environment of the vehicle based on a selection by the driver.

11. A vehicle control system as set forth in claim 1, wherein said reference gaze angle setting means corrects the reference gaze angle based on a width of the road.

12. A vehicle control system as set forth in claim 1, wherein said reference gaze angle setting means corrects the reference gaze angle based on whether the road ahead is a rightward curve or a leftward curve.

13. A vehicle control system as set forth in claim 1, wherein said reference gaze angle setting means sets a plurality of reference gaze angles, and said control means performs a vehicle speed control and a warning based on the result of said comparison by said comparison means involving different ones of said reference gaze angles, respectively.

14. A vehicle control system as set forth in claim 1, further including:

tentative position setting means for setting a tentative position ahead of the actual position; and wherein said gaze angle calculating means determines said gaze angle additionally based on said tentative position.

15. A vehicle control system as set forth in claim 2, further comprising surrounding environment setting means for setting a surrounding environment of the vehicle, wherein said reference gaze angle setting means corrects the reference gaze angle according to the surrounding environment of the vehicle.

16. A vehicle control system as set forth in claim 7, wherein said surrounding environment setting means sets the surrounding environment of the vehicle based on at least one of a lighted state of an illuminating lamp of the vehicle, a working state of a wiper of the vehicle and a selection by the driver.

17. A vehicle control system as set forth in claim 2, wherein said reference gaze angle setting means corrects the reference gaze angle based on a width of the road.

18. A vehicle control system as set forth in claim 2, wherein said reference gaze angle setting means corrects the reference gaze angle based on whether the road ahead is a rightward curve or a leftward curve.

19. A vehicle control system as set forth in claim 2, wherein said reference gaze angle setting means sets a plurality of reference gaze angles, and said control means performs a vehicle speed control and a warning based on the result of said comparison by said comparison means involving different ones of said reference gaze angles, respectively.

* * * * *

UNITED STATES PATENT AND TRADEMARK OFFICE
CERTIFICATE OF CORRECTION

PATENT NO. : 6,141,619
DATED : October 31, 2000
INVENTOR(S) : Hiroshi Sekine

It is certified that error appears in the above-identified patent and that said Letters Patent is hereby corrected as shown below:

Title page,
Under "[56] References Cited", further under "FOREIGN PATENT DOCUMENTS", please include the following references:
--     60-89298      5/1985      Japan
       0586626      3/1994      European Pat. Off.
      19543551     11/1994      Germany --;
In the "[57] ABSTRACT",
Line 12, change "drivers" to -- driver's --.

Signed and Sealed this

Ninth Day of October, 2001

Attest:

NICHOLAS P. GODICI
Attesting Officer     Acting Director of the United States Patent and Trademark Office

UNITED STATES PATENT AND TRADEMARK OFFICE
CERTIFICATE OF CORRECTION

PATENT NO. : 6,141,619
DATED : October 31, 2000
INVENTOR(S) : Hiroshi Sekine

It is certified that error appears in the above-identified patent and that said Letters Patent is hereby corrected as shown below:

Title page,
Under "item [56] References Cited", further under "FOREIGN PATENT DOCUMENTS", please include the following references:
-- 60-89298    5/1985    Japan
   0586626    3/1994    European Pat. Off.
   19543551   11/1994   Germany --;
In "item [57] ABSTRACT", 12th line, change "drivers" to -- driver's --

Column 1,
Line numbered between 54 and 55, change "P0" to -- $P_o$ --.

Column 2,
Line numbered approximately 11, change "P0" to -- $P_o$ --;
Line 13, change "P0'" to -- $P_o'$ --.

Column 3,
Line numbered between 24 and 25, change "diagram s" to -- diagrams --;
Line numbered between 50 and 51, change "M1" to -- M11 --.

Column 4,
Line 6, change "P0" to -- $P_o$ --;
Line 47, change "MS" to -- M5 --;
Line 54, change "N4" to -- $N_4$ --.

Column 6,
Line 53, change "P0" to -- $P_o$ --.

Signed and Sealed this

Thirtieth Day of October, 2001

Attest:

NICHOLAS P. GODICI
Attesting Officer   Acting Director of the United States Patent and Trademark Office